(12) United States Patent
Baron et al.

(10) Patent No.: US 8,073,990 B1
(45) Date of Patent: Dec. 6, 2011

(54) SYSTEM AND METHOD FOR TRANSFERRING UPDATES FROM VIRTUAL FRAME BUFFERS

(75) Inventors: Charles Peter Baron, Port Coquitlam (CA); Daniel Jean Donat Doucette, Port Moody (CA); Paul Andrew Helter, Coquitlam (CA); Bradley Reginald Quinton, Vancouver (CA)

(73) Assignee: Teradici Corporation, Burnaby, British Columbia (CA)

( * ) Notice: Subject to any disclaimer, the term of this patent is extended or adjusted under 35 U.S.C. 154(b) by 263 days.

(21) Appl. No.: 12/586,498

(22) Filed: Sep. 23, 2009

Related U.S. Application Data

(60) Provisional application No. 61/099,521, filed on Sep. 23, 2008.

(51) Int. Cl.
*G06F 13/28* (2006.01)
(52) U.S. Cl. ............................. 710/22; 710/26
(58) Field of Classification Search ............... None
See application file for complete search history.

(56) References Cited

U.S. PATENT DOCUMENTS

| | | | |
|---|---|---|---|
| 5,018,076 A | 5/1991 | Johary et al. | |
| 5,526,017 A | 6/1996 | Wilkie | |
| 5,880,741 A | 3/1999 | Takeuchi | |
| 6,012,101 A | 1/2000 | Heller et al. | |
| 6,038,616 A | 3/2000 | Thornton et al. | |
| 6,046,751 A | 4/2000 | Kato et al. | |
| 6,119,146 A | 9/2000 | Heller et al. | |
| 6,154,793 A | 11/2000 | MacKenna et al. | |
| 6,252,979 B1 | 6/2001 | Lee et al. | |
| 6,292,853 B1 | 9/2001 | Takahashi | |
| 6,333,750 B1 | 12/2001 | Odryna et al. | |
| 6,385,666 B1 | 5/2002 | Thornton et al. | |
| 6,483,515 B1 | 11/2002 | Hanko | |
| 6,570,890 B1 | 5/2003 | Keenan et al. | |
| 6,662,246 B2 | 12/2003 | Honary et al. | |
| 6,664,969 B1 | 12/2003 | Emerson et al. | |
| 6,806,885 B1 | 10/2004 | Piper et al. | |
| 6,963,946 B1 | 11/2005 | Dwork et al. | |
| 7,043,748 B2 | 5/2006 | Thornton et al. | |

(Continued)

OTHER PUBLICATIONS

"Zero Client Technology: History, Use and Critical Comparison", Applica Inc. Web Article (http://www.applica.com/zeroCtech.shtml), pp. 1-5, Copyright 1997-2005.

(Continued)

*Primary Examiner* — Henry Tsai
*Assistant Examiner* — Kris Rhu
(74) *Attorney, Agent, or Firm* — Moser Taboada

(57) ABSTRACT

A method and apparatus for transferring data from a first to a second memory of a computer system. The method comprises (i) initializing a descriptor with a description of physical addressing of a first section of a first array of the first memory; (ii) updating a mask associated with the descriptor with an indication for transferring data from a first sub-section of the first section to the second memory, the mask and the data managed by an application on a first virtual machine of the computer system, the application isolated from the physical addressing of the first section; (iii) responsive to the updated mask, (a) determining physical addresses of the first sub-section based on the description, and (b), transferring the data from the first sub-section to the second memory; and (iv) clearing at least a portion of the updated mask to indicate completion of transferring the data.

16 Claims, 7 Drawing Sheets

U.S. PATENT DOCUMENTS

| | | | |
|---|---|---|---|
| 7,095,386 | B2 | 8/2006 | Alben et al. |
| 7,133,362 | B2 | 11/2006 | Chu et al. |
| 7,136,394 | B2 | 11/2006 | Horowitz et al. |
| 7,161,557 | B2 | 1/2007 | Thornton |
| 7,317,685 | B1 | 1/2008 | Flott et al. |
| 7,350,053 | B1* | 3/2008 | Sugumar et al. ............... 711/207 |
| 7,988,251 | B2* | 8/2011 | Dimitrijevic et al. ........... 347/12 |
| 2001/0000539 | A1 | 4/2001 | Heller et al. |
| 2001/0011965 | A1 | 8/2001 | Wilks |
| 2002/0059639 | A1 | 5/2002 | Thornton et al. |
| 2002/0099919 | A1* | 7/2002 | Normant et al. ............... 711/170 |
| 2002/0149617 | A1 | 10/2002 | Becker |
| 2002/0180725 | A1 | 12/2002 | Simmonds et al. |
| 2003/0098820 | A1 | 5/2003 | Someya et al. |
| 2003/0193486 | A1 | 10/2003 | Estrop |
| 2003/0208340 | A1 | 11/2003 | Dorough |
| 2003/0212811 | A1 | 11/2003 | Thornton |
| 2004/0001622 | A1 | 1/2004 | Roylance et al. |
| 2004/0015597 | A1 | 1/2004 | Thornton |
| 2004/0212730 | A1 | 10/2004 | MacInnis et al. |
| 2004/0222941 | A1 | 11/2004 | Wong et al. |
| 2005/0060421 | A1 | 3/2005 | Musunuri et al. |
| 2005/0204015 | A1 | 9/2005 | Steinhart et al. |
| 2005/0257239 | A1 | 11/2005 | Evans et al. |
| 2006/0080514 | A1* | 4/2006 | Newport ....................... 711/153 |
| 2006/0233201 | A1 | 10/2006 | Wiesenthal |
| 2006/0282855 | A1 | 12/2006 | Margulis |
| 2007/0097130 | A1 | 5/2007 | Margulis |
| 2007/0124474 | A1 | 5/2007 | Margulis |

OTHER PUBLICATIONS

Dale Beermann, Greg Humphreys, "Visual Computing in the Future: Computer Graphics as a Remote Service", University of Virginia, Computer Science Department, University of Virginia Technical Report CS-2003-16, 25 Pages, Jun. 1, 2003.

William Blanke, Chandrajit Bajaj, Donald Fussell, and Xiaoyu Zhang, "The Metabuffer: A Scalable Multiresolution Multidisplay 3-D Graphics System Using Commodity Rendering Engines", TR200-16, The University of Texas at Austin, 7 Pages, Feb. 2000.

Han Chen, Yuqun Chen, Adam Finkelstein, Thomas Funkhouser, Kai Li, Zhiyan Liu, Rudrajit Samanta, and Grant Wallace. "Data Distribution Strategies for High-Resolution Displays", Computers & Graphics. vol. 25 No. 5 :811-818, Oct. 2001, 14 Pages.

A. Heirich and L. Moll. "Scalable Distributed Visualization Using Off-the-Shelf Components", IEEE Parallel Visualization and Graphics Symposium—1999, San Francisco, California, pp. 55-60, Oct. 1999.

Greg Humphreys, Matthew Eldridge, Ian Buck, Gordon Stoll, Matthew Everett, and Pat Hanrahan. "WireGL: A Scalable Graphics System for Clusters", Computer Graphics (SIGGRAPH 2001), 12 Pages, 2001.

Tristan Richardson, Quentin Stafford-Fraser, Kenneth R. Wood and Andy Hopper, "Virtual Network Computing", Reprint from IEEE Internet Computing vol. 2, No. 1, 7 Pages, Jan./Feb. 1998.

"OpenGL Vizserver™ 3.1 Application-Transparent Remote Interactive Visualization and Collaboration", Silicon Graphics Inc. 15 Pages, 2003.

Rajvikram Singh, Byungil Jeong, Luc Renambot, Andrew Johnson, Jason Leigh, "TeraVision: a Distributed, Scalable, High Resolution Graphics Streaming System", Proceedings of Cluster 2004, San Diego, CA, 10 pages, Sep. 2004.

Applica Presenter Product Datasheet, entitled "One PC Can Display and Manage Up to 16 Remote Monitors, Over CAT5 With (Optional) Touch Screen Support", SmartAVI, Inc, 3111 Winona Ave, Suite 101 Burbank, CA 91504, pp. 1-4, no date.

Roger Zimmermann and Dwipal A. Desai, "Ethernet Interface for Head-Mounted Displays", USC technical Report USC-CS-TR05-846, Integrated Media Systems Center, University of Southern California, 12 Pages, Mar. 2005.

Appsense Performance Manager Datasheet v1.1, entitled "Dynamically Manage System Performance, Availability and Capacity", 2 Pages, 2005.

"VMware Workload Management with AppSense Performance Manager", Whitepaper, AppSense Ltd, 3200 Daresbury Park, Daresbury, Warrington, WA4 4BU, United Kingdom, No publication date listed, 12 Pages.

Brian Paul, Sean Ahern, E. Wes Bethel, Eric Brugger, Rich Cook, Jamison Daniel, Ken Lewis, Jens Owen, Dale Southard, "Chromium Renderserver: Scalable and Open Remote Rendering Infrastructure," IEEE Transactions on Visualization and Computer Graphics, vol. 14, No. 3, 14 Pages, May/Jun. 2008.

Lagar-Cavilla, H. A., Tolia, N., Satyanarayanan, M., and de Lara, E. 2007. "VMM-Independent Graphics Acceleration", In Proceedings of the 3rd International Conference on Virtual Execution Environments (San Diego, California, USA, Jun. 13-15, 2007). VEE '07. ACM, New York, NY, 11 Pages.

Jonathan Chien-Liang Liu, David H.C. Du, Simon S.Y. Shim, Jenwei Hsieh, MengJou Lin, "Design and Evaluation of a Generic Software Architecture for On-Demand Video Servers," IEEE Transactions on Knowledge and Data Engineering, vol. 11, No. 3, 20 Pages, May/Jun. 1999.

Office Action mailed Aug. 5, 2009, for U.S. Appl. No. 11/278,128 entitled "Methods and Apparatus for Enabling Multiple Remote Displays", David V. Hobbs, filed Mar. 30, 2006, 32 Pages.

U.S. Appl. No. 11/904,879 entitled "Method and Apparatus for Scheduling a Resource of A Virtual Machine", David Victor Hobbs, filed Sep. 28, 2007, pp. 1-41.

U.S. Appl. No. 12/460,384 entitled "Method and System for Image Sequence Transfer Scheduling", David Victor Hobbs, filed Jul. 17, 2009, pp. 1-62.

Dowty, M. and Sugerman, J., "GPU Virtualization on VMware's Hosted I/O Architecture", SIGOPS Oper. Syst. Rev. 43, Jul. 3, 2009, 73-82. N.Y., USA, pp. 1-8.

Final Office Action mailed Apr. 1, 2010 for U.S. Appl. No. 11/278,128 entitled "Methods and Apparatus for Enabling Multiple Remote Displays", David V. Hobbs, filed Mar. 30, 2006, pp. 1-36.

ABTS, Dennis et al., "The Cray Black Widow: A Highly Scalable Vector Multiprocessor," Proceedings of the 2007 ACM/IEEE Conference on Supercomputing (Reno, Nevada, Nov. 10-16, 2007), SC '07, ACM, New York, NY, pp. 1-12.

"Advances in Memory Management for Windows", Microsoft Corporation, Oct. 12, 2007.

U.S. Appl. No. 12/460,384, filed Jul. 17, 2009, entitled "Method and System for Image Sequence Transfer Scheduling."

* cited by examiner

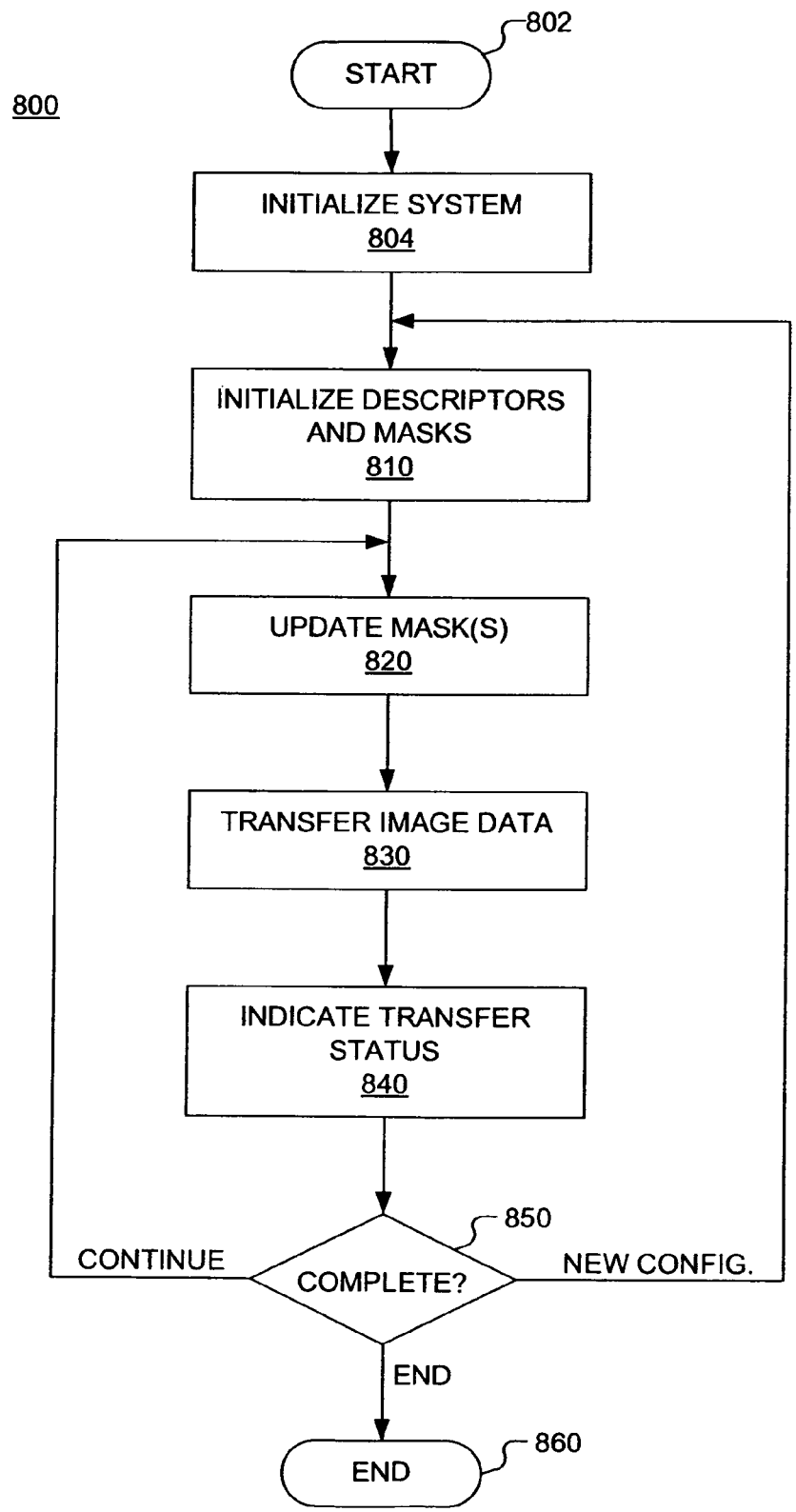

SYSTEM AND METHOD FOR TRANSFERRING UPDATES FROM VIRTUAL FRAME BUFFERS

CROSS-REFERENCE TO RELATED APPLICATIONS

This application claims benefit of U.S. provisional patent application Ser. No. 61/099,521, filed Sep. 23, 2008, which is herein incorporated in its entirety by reference.

This application references co-pending, commonly assigned U.S. patent application Ser. No. 12/460,384, filed Jul. 17, 2009, which is herein incorporated in its entirety by reference.

BACKGROUND OF THE INVENTION

1. Field of the Invention

Embodiments of the present invention generally relate to virtual computing, and, more specifically, to image data transfer in a virtual computing environment.

2. Description of the Related Art

Direct Memory Access (DMA) provides a capability for certain computer hardware sub-systems to access a computer's memory for read and write operations without affecting the state of the computer's central processor. Such an ability to directly access the computer's memory frees the central processor from involvement with a data transfer, such as a transfer of data to a peripheral system of the computer, thereby speeding up overall computer operations. In some computer systems, a DMA controller (DMAC) may perform the DMA data transfer operations, for example, the copying of data from one computer memory to another.

Several techniques currently exist that address the requirement to instruct a DMAC to copy selective data from physical memory that is directly addressable by both software and the DMAC. One such technique includes a 'write-back' caching structure in which a cache memory comprises dirty page flags, where the dirty page flags inform the DMAC which memory locations should be accessed for data transfer. Another technique comprises a masked data Random Access Memory (RAM) associated with two dimensional video memory. The masked data RAM is used to regulate the DMAC access to memory that defines the position and shape of a moving window of video data designated for transfer to a video device.

However, in virtualized environments where a computer employs one or more virtual machines, software inside a virtual machine is abstracted from the computer's physical memory architecture for security purposes, making it difficult for the above techniques to instruct a DMAC as to which physical memory locations should be accessed for data transfer. Moreover, the problem is exacerbated when the virtualized memory comprises multi-dimensional data structures, such as image frames, due to the fact that the multi-dimensional data structures are located in non-contiguous physical memory.

Therefore, there is a need in the art for an efficient method for instructing DMAC resources to access selective data located in virtualized memory.

SUMMARY OF THE INVENTION

Embodiments of the present invention generally relate to a method and system for transferring data from a first computer memory of a computer system to a second computer memory of the computer system. At least a portion of the method is performed by the computer system, the computer system comprising at least one processor. The method comprises (i) initializing a descriptor with a description of physical addressing of a first two dimensional (2D) section of a first 2D data array of the first computer memory; (ii) updating a mask associated with the descriptor with an indication for transferring image data from a first 2D sub-section of the first 2D section to the second computer memory, the mask and the image data managed by an application on a first virtual machine of the computer system, the application isolated from the physical addressing of the first 2D section; (iii) responsive to the updated mask, (a) determining physical addresses of the first 2D sub-section based on the description of physical addressing, and (b), transferring the image data from the first 2D sub-section to the second computer memory; and (iv) clearing at least a portion of the updated mask to indicate completion of transferring the image data to the second computer memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 is an illustration of a process for transferring updated image data from sub-sections of frame buffers within a first memory to a second memory in accordance with one or more embodiments of the present invention.

DETAILED DESCRIPTION

Figure 1:
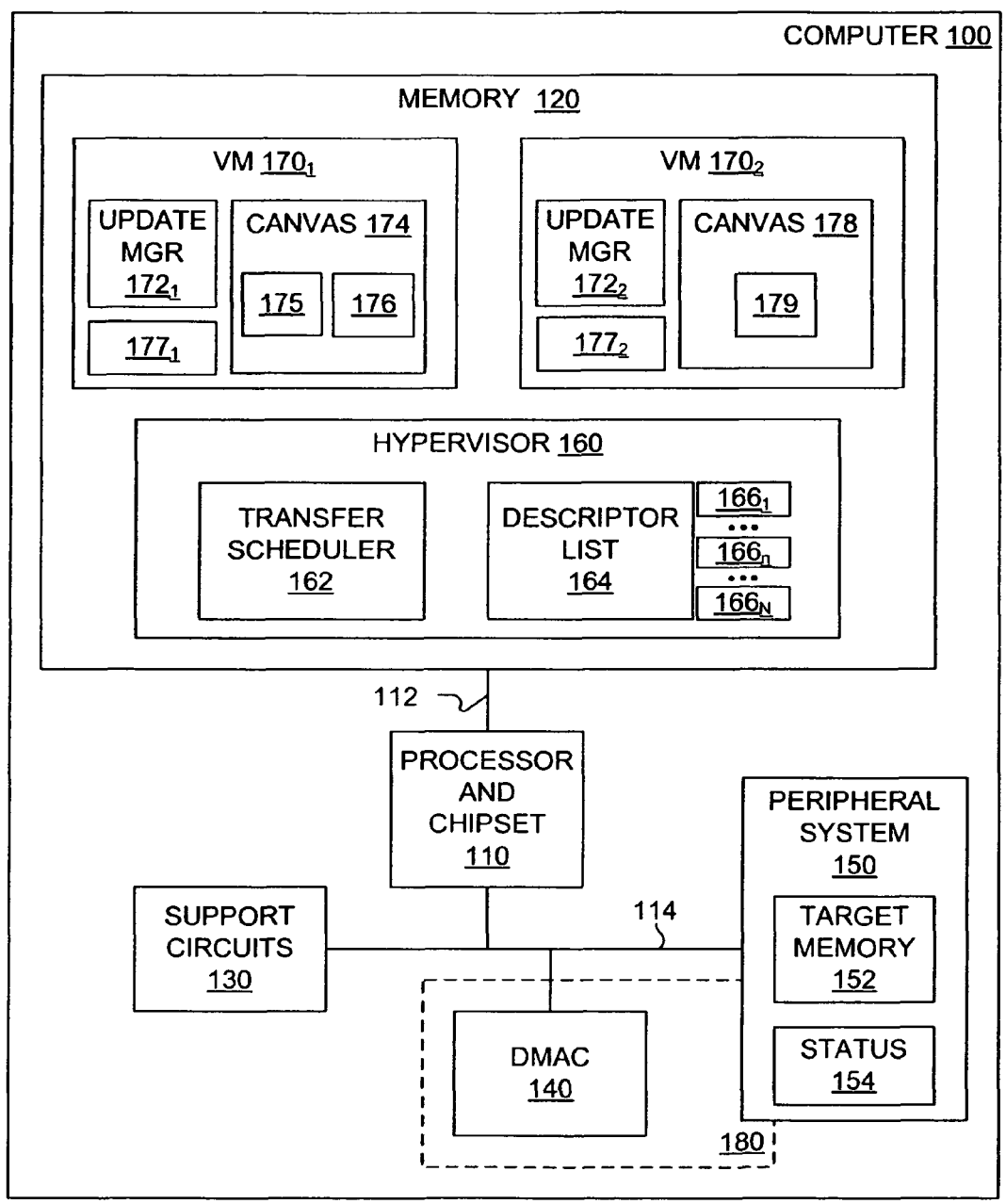
FIG. 1 is a block diagram of a computer comprising a virtual computing environment in accordance with one or more embodiments of the present invention.

The present invention discloses a system and method for transferring updated image data from multiple two dimensional (2D) data arrays, as may be stored in frame buffer structures of multiple virtual machines (VMs), to a peripheral system for further time critical processing. Such time-critical processing may include, for example, image compression prior to transmitting the image data to a remote computer for display. The image data transfer operation is performed by a DMA controller (DMAC). Based on updated frame buffer sections identified by software (e.g., an update manager or a software application) executing in each VM, the DMAC is directed to selective image data for transfer. Additionally, the image data transfer operation is based on the availability of resources individually associated with each VM that are administered by the peripheral system. In various embodiments in which frame buffer memory is pre-allocated and remains fixed (i.e., address locked), descriptor lists are created for each address locked frame buffer. The descriptor lists comprise descriptors having the addressing structures necessary for the DMAC to access selective areas of the frame buffers, or 2D data arrays, allowing the DMAC to quickly address and transfer image data for defined regions (e.g., sub-sections) of each frame buffer. Software associated with the frame buffer (e.g., the update manager) sets dirty bits of a mask mapped to the frame buffer (e.g., one bit mapped to each sub-section of the frame buffer) to identify frame buffer sub-sections that have been updated.

In order to maintain maximum image data throughput and minimum delays, the peripheral system monitors the availability of resources for consuming image data from each frame buffer (e.g., communication, storage and processing resources) and provides individual indications of transfer readiness of each applicable resource to the DMAC. Then, based on a prioritized sequence, the DMAC transfers image data from sub-sections of the frame buffers to the peripheral system as indicated by the dirty bit masks and the indications of transfer readiness. In select embodiments, the DMAC maximizes transfer throughput by reading ahead in the descriptor lists and masks to determine the transfer requirement and addresses for the next transfer operation. The DMAC may also maximize transfer throughput by reordering descriptors to maximize burst transfer features of a peripheral expansion bus; alternatively, transfer scheduling software may perform such descriptor reordering. Additionally or alternatively, the DMAC may align transfer batches along natural image boundaries, such as image slice or frame boundaries, to maximize transfer throughout. Transfer operations executed by the DMAC may be synchronized with peripheral system image data processing operations in order to optimize concurrency. Such image data processing operations include encoding the transferred image data, and transmitting the encoded image data to remote computers associated with the virtual machines.

FIG. 1 is a block diagram of a computer 100 comprising a virtual computing environment in accordance with one or more embodiments of the present invention. The computer 100 comprises a processor 110 and memory 120, including frame buffers 175, 176, and 179, coupled to a peripheral system 150. In various embodiments, computer 100 is a personal computer, computer server, or other computing appliance generally designated for running software associated with one or more 2D data arrays (e.g., image data frame buffers), and either incorporating or coupled to a peripheral processing system designated for processing the data associated with the one or more 2D data arrays.

In an embodiment, computer 100 comprises processor and chipset 110 coupled to memory 120 by bus 112. In various embodiments, processor and chipset 110 comprises one or more Central Processing Units (CPUs), one or more Graphic Processing Units (GPUs), or a combination of CPU and GPU processing elements, and additional elements such as north bridge, south bridge, bus controller, and memory controller elements, necessary for coupling memory 120, DMAC 140, and peripheral system 150. FIG. 1 portrays only one variation of many possible configurations of computer 100. In some embodiments, computer 100 comprises multiple CPU cores or separate CPUs, for example, interconnected by a HYPER-TRANSPORT fabric or the like with computer memory 120 distributed between CPUs accordingly. Examples of a well known suitable CPUs include server or workstation class processors, such as 32-bit, 64-bit, or other CPUs, including OPTERON, ATHLON, or PHENOM class microprocessors manufactured by AMD Corporation; XEON, PERYN, PENTIUM, or X86 class processors manufactured by INTEL; SPARC microprocessors manufactured by SUN MICROSYSTEMS Inc.; or microprocessors such as PowerPC or Power7 processors manufactured by Motorola or IBM, respectively. However, any other microprocessor platform designed to perform the 2D data transfer methods described herein may be utilized. In some embodiments, processor and chipset 110 incorporates hardware-based virtualization management features, such as INTEL VT-d technology, emulated register sets, address translation tables, interrupt tables, PCI I/O virtualization (IOV) features, and/or an I/O memory management unit (IOMMU) to enable DMA operations between memory 120 and peripheral system 150 with limited hypervisor intervention.

Bus 112 comprises one or more data buses, such as one or more primary memory buses, (e.g., coupled to a north bridge or memory controller hub of processor and chipset 110), HYPERTRANSPORT buses, Accelerated Graphics Port (AGP) buses, an industry compatible peripheral expansion bus (e.g., a Peripheral Component Interconnect (PCI) or a PCI-EXPRESS bus), or a combination of one or more such data buses.

Memory 120 comprises any one or combination of volatile computer readable media (e.g., random access memory (RAM), such as DRAM, SRAM, XDR RAM, DDR RAM, on-die cache memory, and the like) and nonvolatile computer readable media (e.g., ROM, hard drive, tape, CDROM, DVDROM, magneto-optical disks, EPROM, EEPROM, Flash EPROM, and the like). Moreover, memory 120 may incorporate electronic, magnetic, optical, and/or other types of storage media. In an exemplary embodiment, the memory 120 stores executable software in the form of machine-readable instructions, including machine executable instructions and data structures of hypervisor 160, and machine executable instructions and data structures associated with various virtual machines 170 (depicted as VM $170_1$ and VM $170_2$ in FIG. 1 without loss of generality). In some embodiments, computer 100 executes additional VMs, for example, 32 or 64 VMs, where at least one of the VMs comprises a frame buffer and frame buffer update management resources described below.

Hypervisor 160 manages the virtual machines $170_1$ and $170_2$. Generally, the hypervisor 160 (alternatively referred to as a 'Virtualization Manager' in some embodiments) coordinates the execution schedule of the virtual machines 170 and the interaction of the virtual machines 170 with various hardware components, for example, by ensuring non-overlapping memory ranges available to each VM in the system. Examples of commercially available hypervisor products include ESX or VSPHERE products from VMWARE Corporation, XEN-SERVER from CITRIX Corporation, HYPER-V from MICROSOFT Corporation, and products such as the VIRTUAL IRON hypervisor or similar products based on open source XEN source code. It will be appreciated by those of ordinary skill in the art that hypervisor 160 comprises various functional elements, such as resource manager, address manager, virtual machine monitors, distributed VM file system, network stack, virtual network interface, storage stack, device drivers, and hardware interface drivers, omitted from FIG. 1 for clarity.

VM 170 is an operating system domain or similar 'computing process' of computer 100. In general terms, a VM 170 comprises the data structures necessary to execute an interdependent set of processes (i.e. software applications) scheduled by hypervisor 160. The hypervisor 160 enables address translation functions necessary to isolate the physical address space of the computer system from the logical addresses utilized by software applications to access data structures. Such data structures include 2D data arrays (e.g., frame buffers) within a VM domain (i.e., the logical addressing of the virtualized domain is autonomous of the physical address space). Each VM 170 under control of the hypervisor 160 is an autonomous operating system environment with one or more applications and related drivers. In an exemplary embodiment, each VM comprises an operating system, such as a WINDOWS operating system from MICROSOFT, Inc. (e.g., WINDOWS XP or WINDOWS VISTA), a LINUX operating system available from many vendors, or a UNIX operating system, also available from many vendors including HEWLETT-PACKARD, Inc., or SUN MICROSYSTEMS, Inc. It will be recognized by those skilled in the art that embodiments of VM 170 typically further comprise operating system, application software, drivers, administrative software and the like, not depicted in FIG. 1. Well known application software includes one or more executable applications with image display presentation or storage requirements, such as word processing software, spreadsheets, financial data presentation, video/photo editing software, graphics software such as Computer Aided Design (CAD) software, Desktop Publishing (DTP) software, digital signage software or the like. Well known graphics and image composition drivers include OPENGL from SILICON GRAPHICS corporation, DIRECTX and WINDOWS VISTA Desktop Windows Manager (DWM) from MICROSOFT CORPORATION or QUARTZ from APPLE CORPORATION.

VM $170_1$ comprises update manager $172_1$ and a memory region termed an "image canvas" (i.e., image canvas 174) allocated for image data storage. In an embodiment, an image canvas comprises a larger 2D data array incorporating one or more smaller 2D data arrays termed frame buffers. Image canvas 174 comprises frame buffers 175 and 176, where each frame buffer 175 and 176 is typically sized to match the configuration of a unique display device. Each frame buffer 175 and 176 comprises a 2D array of image data stored within a locked address range, such as partial or multiple memory pages, allocated for the storage of image data. Such image data may be associated with the rendering, drawing, or composition of one or more output display images by the operating system or application software of VM 170. In an embodiment, each frame buffer 175 and 176 comprises pixel data typically ordered in raster format. VM $170_2$ comprises update manager $172_2$ and an image canvas 178, comprising frame buffer 179. In other embodiments, each VM 170 may have one or more frame buffers independent of an image canvas structure, or may have one or more canvases, any of which may comprise one or more frame buffers. In various alternative embodiments, canvas 174 or 178 may comprise frame buffers associated with decomposed, partial, or composite display images, such as video, picture, background or text windows, composite image buffers, a drawing command queue, or frame buffers spanning multiple display devices. In some embodiments, canvas 174 or 178 comprises frame buffers located in video memory associated with a GPU.

Update manager $172_1$ comprises machine-executable software disposed to detect updates, initiated by operating system or application software of VM $170_2$, to image data stored in frame buffers 175 or 176. The detection of updates may be accomplished by monitoring drawing commands for instructions that change pixel values, by monitoring bus 112 for access operations corresponding with an address range allocated to a frame buffer 175 or 176, or by evaluating support hardware or software that records 'sticky bits' associated with frame buffer access. In some embodiments, each frame buffer 175 and 176 is delineated into sequential slices, or 2D sections, and each section is further delineated into 2D subsections. Update manager 172 (or alternative configuration software) initializes a mask bitmap 177 (i.e., update manager $172_1$ initializes mask bitmap $177_1$ and update manager $172_2$ initializes mask bitmap $177_2$ in FIG. 1) in a memory location accessible to transfer scheduler 162. Each row of mask bitmap $177_1$ corresponds to a section of a frame buffer 175 or 176, and each bit within a row corresponds to a sub-section of the section; analogously, each row of mask bitmap $177_2$ corresponds to a section of frame buffer 179, and each bit within a row corresponds to a sub-section of the section. When content within a frame buffer sub-section is updated, update manager 172 sets the bit within the mask bitmap 177 that corresponds to the updated sub-section. Transfer scheduler 162 copies the corresponding row of mask bits to a stride mask $166_n$ ($1 \leq n \leq N$) either embedded in a descriptor of descriptor list 164 or referenced by a descriptor of descriptor list 164. The descriptor list 164 is subsequently processed by the DMA Controller (DMAC) 140, using the stride masks $166_1$ thru $166_N$ to identify the frame buffer sub-sections that contain the updated image data to be communicated.

Likewise, update manager $172_2$ detects updates to canvas 178 and sets the corresponding mask bits accordingly. Based on the updated mask bits, the transfer scheduler 162 in turn sets corresponding stride masks 166 corresponding to frame buffer 179 before the descriptors are processed by DMAC 140, as described below.

In an alternative embodiment, the mask bitmaps $177_1$ and $177_2$ are located in memory accessible to both an update manager and, with limited privileges, to DMAC 140, obviating a need for the transfer scheduler 162 to copy mask values into stride masks 166 of descriptors. In such an embodiment, the mask bitmap 177 is stored separately from the descriptor list 164 for security purposes.

Transfer scheduler 162, an embodiment of which is disclosed in co-pending U.S. patent application Ser. No. 12/460, 384, filed Jul. 17, 2009, which is herein incorporated in its entirety by reference, comprises machine-executable software disposed to manage descriptor list 164, including providing such functions as indicating frame buffer updates received from update manager 172 as change indicia in stride mask fields of descriptors in descriptor list 164. Descriptor list 164 comprises a set of descriptors that describe all frame buffers of memory 120 (ref. buffer 175, 176 and 179), i.e., frame buffers from multiple VMs 170. In an embodiment, each descriptor in the descriptor list 164 describes a section of a frame buffer in terms of address information, and comprises a stride mask which contains information corresponding to sub-sections within the section.

In an embodiment, transfer scheduler 162 initializes descriptor list 164 by configuring associations between descriptors and frame buffers, each descriptor typically associated with a unique section (such as a slice) of a frame buffer. In various indirect-mapped embodiments, transfer scheduler 162 performs the address translation between VM 170 and physical domain page addressing required by the DMAC 140 (ref. descriptor 410 detail in FIG. 5). In some direct-mapped embodiments in which the underlying hardware comprises IO Memory Management Unit (IOMMU) address translation facilities (e.g., INTEL VT-D or AMD-V architectures), descriptors and descriptor address configuration functions may be located in the VM domain. In some such embodiments, Guest Physical Address (GPA) addressing of frame buffers is obtained from the hypervisor 160 and copied into a designated address field of each descriptor.

In an embodiment, transfer scheduler 162 enqueues a descriptor (of descriptor list 164) associated with an updated frame buffer for processing by DMAC 140 after a defined period, for example, a period defined by a threshold number of frame buffer updates, the presence of a frame update interrupt, the availability of a tear-free image, a scheduled buffer transfer interval, or resource availability information provided by DMAC 140 and/or peripheral system 150, including memory availability and processing bandwidth availability. In some embodiments, transfer scheduler 162 sets a flag in the enqueued descriptor to indicate descriptor availability for DMA processing. In other embodiments, descriptors are written to a processing queue and a tail pointer register local to DMAC 140 is advanced to indicate availability of one or more enqueued descriptors.

In various embodiments, transfer scheduler 162 is further tasked with setting frame buffer transfer priorities and managing synchronization between frame buffer rendering operations and transfer operations. In some such embodiments, hypervisor 160 provides transfer scheduler 162 with VM execution timing information used to adjust transfer priorities by reordering descriptor list 164. In other embodiments, transfer priorities are set according to processing resource availability, for example as indicated by reading status 154 of peripheral system 150. In other embodiments, transfer scheduler 162 previews descriptors available for processing and aggregates them according to physical page information such that image data transfers over bus 114 use burst transfer features of the processor expansion bus. In some embodiments, transfer scheduler 162 prevents image tearing by pausing rendering operations for frame buffers under DMA ownership and/or delaying DMA processing until an entire image frame has been rendered. In some embodiments, transfer scheduler 162 is enabled to purge committed descriptors, for example if the committed descriptors become obsolete (e.g., due to a subsequent image update) prior to associated image data transfer. In an embodiment, such ownership of imaging data is communicated via a mutex signaling structure.

In alternative embodiments of computer 100, parts or all of update manager 172 and/or transfer scheduler 162 comprise machine executable software or hardware logic executed by one or more functions of DMAC 140, processor and chipset 110 (e.g., a GPU function), or peripheral system 150. In some embodiments, the memory 120 comprises various combinations of separate or combined cache memory, instruction memory, data memory and graphics data memory and system memory coupled to processor and chipset 110 by multiple buses. In some such embodiments, transfer scheduler 162 and update manager 172 are stored in instruction memory, descriptor list 164 is stored in data memory and canvases 174 and/or 178 are stored in graphics data memory.

DMAC 140 and peripheral system 150 are coupled to processor and chipset 110 by bus 114. In various embodiments, bus 114 comprises one or more peripheral expansion buses, for example but not limited to, a combination of one or more PCI and/or PCI-EXPRESS buses, local buses, or alternative buses such as multi-master buses suitable for image data transfer. In various embodiments, bus 114 is one of the same bus as bus 112, a segment of bus 112 or independent of bus 112. Buses 112 and 114 have additional elements (omitted from FIG. 1) to enable communications among the coupled components, such as controllers, data buffers, drivers, repeaters, receivers, and additional address, control, interrupt and/or data connections.

DMAC 140 comprises one or more DMA engines enabled to transfer image data from frame buffers 175, 176 and 179 to target memory 152 of peripheral system 150. The associations between DMA engines and descriptor list 164 for transferring the image data is achieved according to any of several partitioning strategies. Such strategies include: a) utilizing a single DMA engine mapped to all image canvases of memory 120 in FIG. 1 (i.e., canvases 174 and 178); b) N-number of DMA engines (where N>1), each DMA engine assigned a copy of the entire descriptor list 164 associated with all image canvases of memory 120, and each DMA engine further assigned only select accessible frame buffer slices (i.e., sections) by transfer scheduler 162; c) N-number of DMA engines, each assigned a different partial copy of descriptor list 164, thereby allocating different sub-lists to different DMA engines, or, d) a direct-mapped association where N-number of DMA engines are each assigned a different image canvas for processing.

In an embodiment, DMAC 140 comprises multiple DMA engines (e.g., four engines), each tasked with processing a different portion of descriptor list 164. Each DMA engine pre-fetches descriptors (from a specified portion of descriptor list 164) designated for processing. Sub-sections of frame buffers 175, 176, and 179 indicated by the stride masks of the pre-fetched descriptors are accessed and the image data within the sub-sections transferred to target memory 152. In various embodiments, DMAC 140 is further enabled to respond to commands issued by processor and chipset 110, for example by responding to control commands, such as 'pause', 'halt', 'disable', or 'interrupt on completion' commands, embedded in a command field of the descriptor, programmed as a register in the DMAC 140, or set as flags in memory 120 and accessed by DMAC 140. In one embodiment, DMAC 140 is co-located with peripheral system 150 or incorporated as a component within peripheral system 150 (represented by the dashed portion 180 of peripheral system 150) and coupled to target memory 152 by a local bus, such as an Advanced Microprocessor Bus Architecture (AMBA) bus, or other suitable local bus independent of bus 114. In an alternative embodiment, such as a collaboration system comprising inbound frame buffer overlays, DMAC 140 is enabled to transfer image data in the reverse direction from target memory 152 to memory 120. In some such embodiments, transfer scheduler 162 maintains a transfer list describing desired updates from target memory 152 to one of the frame buffers. In another such embodiment, the peripheral system 150 maintains a list manager and descriptor list associated with image data in memory 152 destined for a frame buffer of memory 120.

Peripheral system 150 is an image processing sub-system that processes image data updates received from memory 120. In an exemplary remote computing embodiment, image updates related to a change in a display image are compressed by peripheral system 150 and forwarded to a client computer for display. Peripheral system 150 comprises target memory 152 enabled to receive data from DMAC 140. In an embodiment, target memory 152 comprises memory regions of comparable dimensions to the frame buffers in memory 120, which enables transfer of 2D sub-sections without transformation.

In various embodiments, peripheral system 150 comprises processing resources, such as one or more microprocessors and/or logic sequencers, enabled to apply further processing to image data in memory 152. Such processing may include data transformation, encoding, storage, and/or communication to one or more remote systems for subsequent decoding and remote display. In some such embodiments, descriptors in descriptor list 164 comprise target instruction fields used to communicate processing instructions (determined by image processing software in the VM domain) to peripheral system 150 in conjunction with the sub-section updates indicated by the stride mask. Such processing instructions are then executed by peripheral system 150. As one example, peripheral system 150 selects image encoding parameters, such as image quality or encoder type (MPEG, JPEG, lossless, and the like), according to image type information provided in the processing instructions.

In some embodiments, image data read by DMAC 140 from memory 120 is modified by encoding resources prior to storage in target memory 152. In one such embodiment, image data is translated on-the-fly prior to storage (e.g., RGB to YUV translation). In other embodiments, the pixel bit depth is modified prior to storage, or image data is encrypted to enable direct communication to a remote system. In still other embodiments, the data structure native to image data in memory 120 is modified to suit data structures native to memory 152. As one example, 32-bit words comprising packed 8-bit RGB (Red, Green, Blue) image data native to memory 120 are unpacked into 3×32-bit words, each comprising an 8-bit R, G or B color component, stored in memory 152. In some embodiments, peripheral system 150 comprises status information 154, for example, a set of status flags accessible to transfer scheduler 162 that provide an indication of processing completion status, memory availability, bandwidth availability; flags that provide an indication, such as inbound image data availability, used in bidirectional applications (e.g., collaboration); and the like.

In various embodiments, processor and chipset 110, memory 120, DMAC 140, and peripheral system 150 are coupled with the aid of support circuits 130. Support circuits 130 include at least one of power supplies, clock circuits, data registers, I/O interfaces, network interfaces, controllers, data buffers, drivers, repeaters, receivers, or the like, to enable appropriate communications between the components of computer 100.

In some alternative embodiments, the memory 120 is not necessarily segmented into distinctive hypervisor and VM domains. In some such embodiments, update management and transfer scheduling functions are combined to detect frame buffer updates and manage a descriptor list accordingly.

Figure 2:
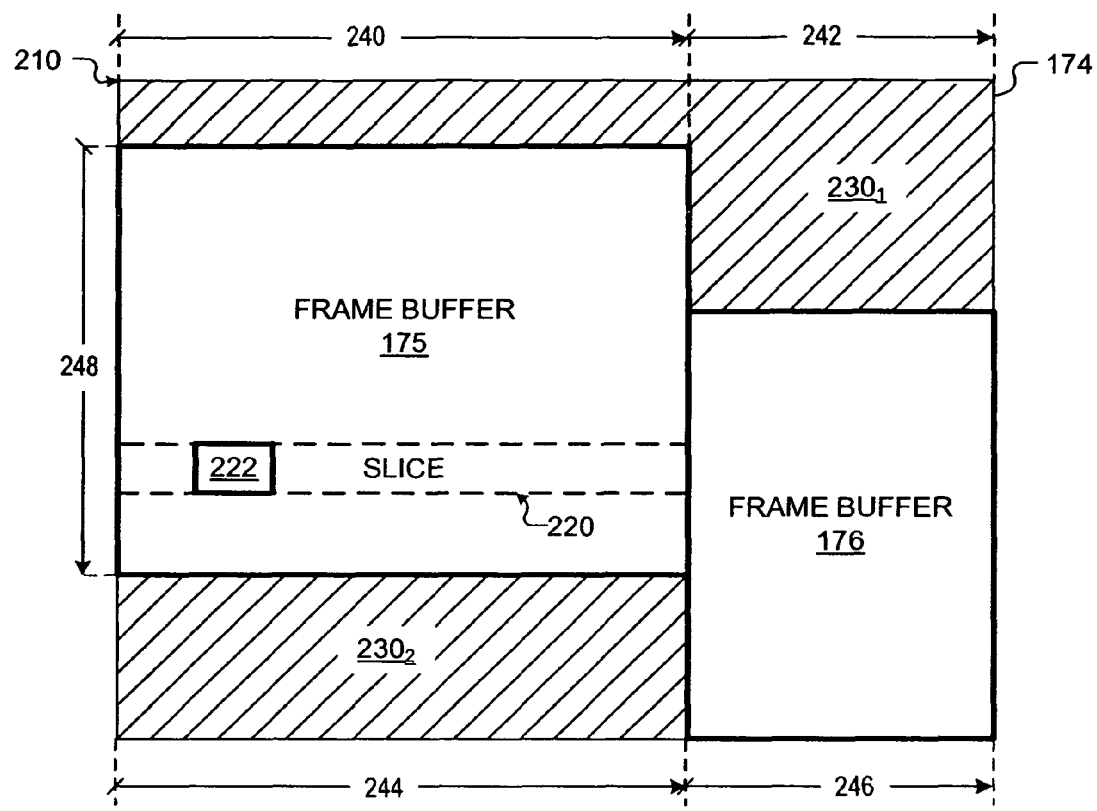
FIG. 2 is a block diagram of one embodiment of an image canvas comprising multiple frame buffers.

FIG. 2 is a block diagram of one embodiment of image canvas 174 comprising multiple frame buffers 174 and 175. Image canvas 174 comprises frame buffers 175 and 176, at least partially bounded by unused memory regions 230$_1$ and 230$_2$ of canvas 174. While frame buffers 175 and 176 are depicted in FIG. 2 as adjoining memory regions, other embodiments comprise frame buffers separated by unused memory regions, or adjoining frame buffers occupying an entire image canvas. Memory location 210 indicates a page-aligned initial memory location for image canvas 174 for purposes of example, but image canvas 174 need not be page aligned. While FIG. 2 depicts frame buffer 175 offset from location 210, other embodiments comprise frame buffer 175 aligned with location 210. In select embodiments where the image canvas 174 exactly matches a display resolution, the horizontal width of each of the frame buffers 175 and 176 match the horizontal dimension of the canvas 174. Alternatively, in the absence of an image canvas 174, the dimensions of frame buffer 175 match the 2D data array dimensions of memory allocated for image data.

Frame buffer 175 is a rectangular 2D data array, typically allocated by an operating system (in conjunction with underlying virtualization functions) for storage of image data and associated with a display device, such as a monitor operating at a defined resolution. The number of pixel rows (i.e., frame buffer depth 248 in the Y dimension) and pixel columns (i.e., frame buffer width 240 in the X dimension) typically match the desired display resolution (e.g., 1200 pixel rows×1600 pixel columns). In an exemplary embodiment, each pixel row comprises 32-bit contiguously distributed pixel values. In other embodiments, each pixel is represented by fewer or more bits, such as 16, 24, 48, or 64 bits, which may be zero padded or packed for efficiency as required.

In an embodiment, frame buffers 175 and 176 are each delineated into a set of contiguous, non-overlapping, uniform, horizontal sections or 'slices', each section of each frame buffer 175 and 176 associated with a unique descriptor in descriptor list 164 of FIG. 1. Each section of each frame buffer 175 and 176 (ref. example slice 220) comprises a specified number of pixel rows (e.g., 64 pixel rows) across the frame buffer width (i.e., across width 240 in the case of frame buffer 175 or width 246 in the case of frame buffer 176). While each section associated with a frame buffer 175 or 176 typically comprises the same number of pixel rows, one or more sections may comprise a different number of pixel rows to accommodate non-divisible dimensions or variable section definition, for example, based on image attributes (such as lossy or lossless image type) or image update history. As one example, a history of image changes consistently covering a large display surface area may warrant bigger sections for efficiency. As another example, small font text pixels may warrant smaller sections for improved efficiency or resolution in the peripheral system.

In terms of descriptor definition, each section is specified in terms of a frame buffer width and a frame buffer address pitch. The address pitch defines the number of unused memory locations (or memory allocated to other frame buffers) between consecutive rows of the frame buffer, enabling DMAC 140 (FIG. 1) to skip such unused memory locations during transfer operations. As depicted in FIG. 2, sections of frame buffer 175 are specified in terms of width 240 and address pitch 242, while sections of frame buffer 176 are specified in terms of width 246 and address pitch 244. In an embodiment, each section is further delineated into a set of non-overlapping uniform sub-sections, or 'unit-columns' (ref. unit-column 222). A stride mask of each descriptor in descriptor list 164 comprises a 'dirty bit' indicator associated with each unit-column, i.e., sub-section, in the corresponding section. The DMAC either skips or transfers the image data within a sub-section based on the value of the dirty bit in the stride mask. In some embodiments, each sub-section is specified by a variable transfer priority value rather than a 'dirty bit'. Such transfer priority values may be cumulated over a slice (i.e., section) or frame update (typically by peripheral system 150) and used to provision upstream resources, such as bandwidth. In other embodiments, each dirty-bit defines image data distribution privileges, for example, as a means for specifying image data distribution in a multi-display environment. A remote presentation system in which a presenter would like to only deliver part of a screen to the viewers is an example of a system with such a requirement.

Figure 3:
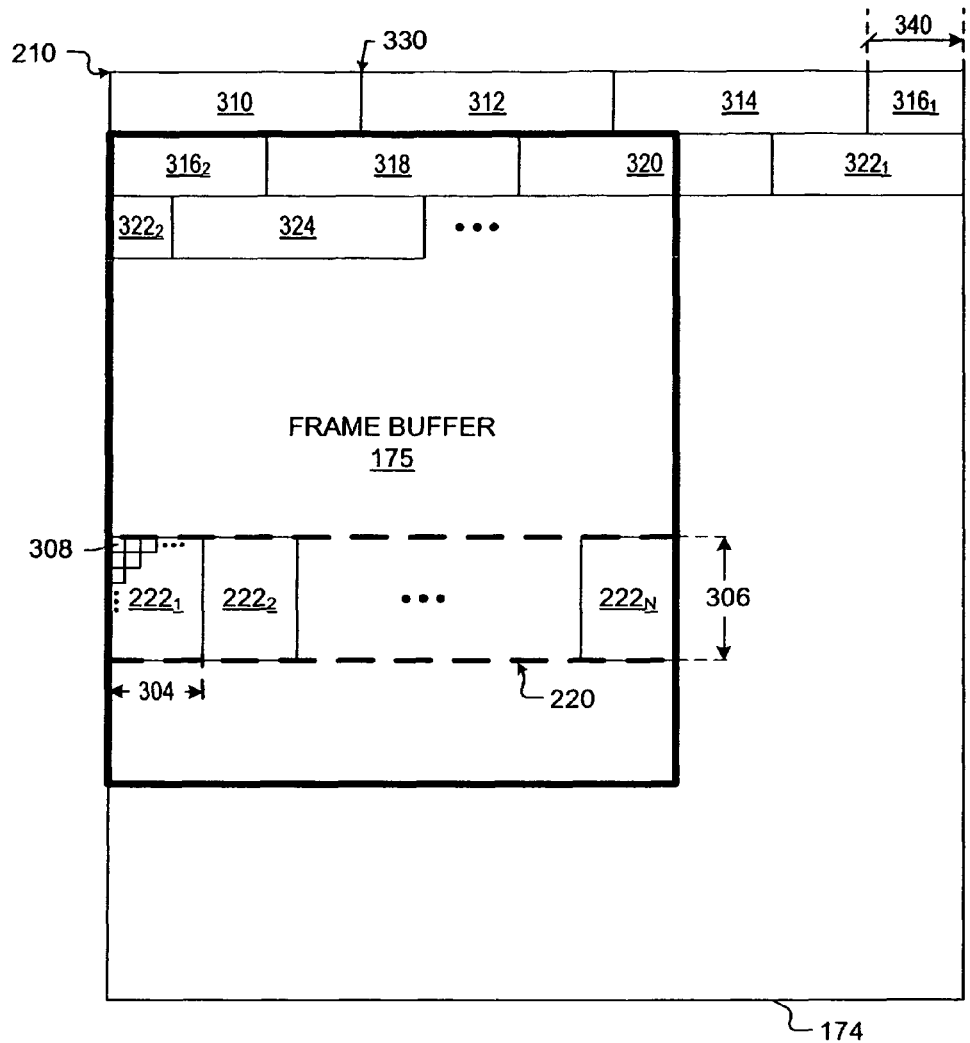
FIG. 3 is a block diagram depicting one embodiment of an alignment of a frame buffer with respect to the defined memory pages of an image canvas.

FIG. 3 is a block diagram depicting one embodiment of an alignment of frame buffer 175 with respect to the defined physical memory pages of an image canvas 174. While FIG. 3 depicts frame buffer 175, the 2D image canvas 174 may comprise a plurality of 2D data arrays as described. Memory pages 310, 312, 314, 316, 318, 320, 322, and 324 are the first few in a contiguous set of memory pages (i.e., contiguous regions of physical memory) allocated to image canvas 174, commencing at address location 210. Page boundary 330 indicates the boundary of page 310, typically a 4 kilobyte page boundary exemplified by various generic computer architectures. Frame buffer 175 starts midway through memory page 316, offset from the boundary between pages 314 and 316 by distance 340. Unless frame buffers are page-aligned, distance 340 is a required buffer offset parameter in defining the first location of frame buffer 175.

FIG. 3 also depicts selected details of frame buffer slice 220. Slice 220 is delineated into rectangular sub-sections of pixel areas, designated as sub-sections $222_1$-$222_N$. The base address for slice 220 is assigned the address of pixel 308, which is the pixel at location [0,0] in sub-section $222_1$. Each sub-section $222_1$-$222_N$ comprises a width corresponding to dimension 304 and a height corresponding to dimension 306; in some embodiments, each sub-section comprises a block of pixels, e.g., 8×8 pixels, 64×64 pixels, and the like. Sub-sections may comprise different widths. For example, in one embodiment, the last sub-section $222_N$ of slice 222 may comprise fewer or more pixel columns than other sub-sections in the slice 222 if the slice width is not equally divisible. In another embodiment, slices are specified with increased height (i.e., an increased number of rows) to relax scheduling or synchronization timing. Yet another embodiment supports variable mask granularity whilst utilizing unchanged DMAC address processing logic by adjusting the sub-section width to support an alternative pixel packing arrangement. For example, if the sub-section width is widened to support packed 24-bit pixel data rather than unpacked 32-bit pixel data, descriptor mask granularity may be adjusted from 32×32-bit pixels to 128×24-bit pixels using the same DMAC. In another embodiment, a smaller unit-column, or sub-section, (i.e., a narrower dimension 304) is selected to achieve finer resolution of sub-sections. In yet another embodiment, the dimensions of sub-sections $222_1$-$222_N$ are scaled dynamically, for example responsive to image type attributes or system-level latency requirements. Sub-sections need not be rectangular; for example, non-rectangular sub-sections may be utilized in instances where transfer descriptors are associated with non-rectangular image content-related objects, such as icons, buttons or other non-rectangular shapes.

Figure 4:
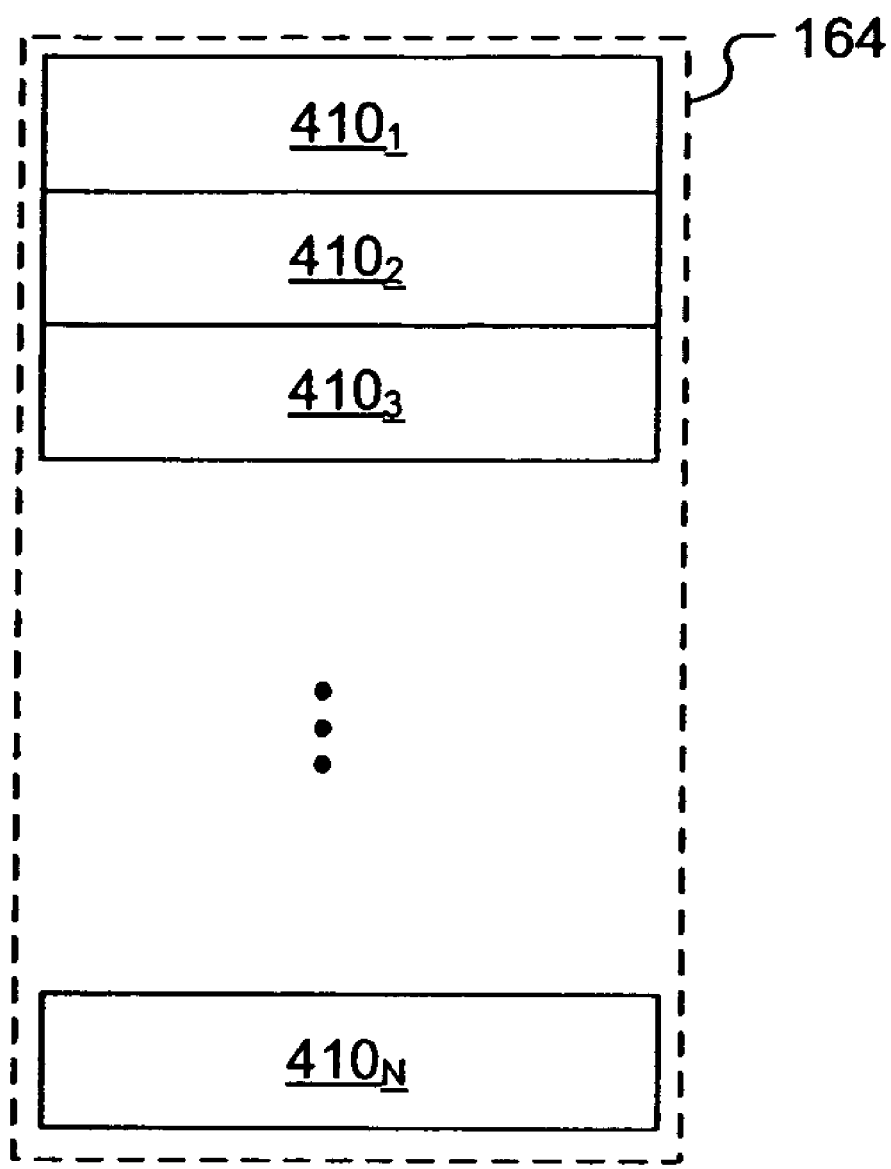
FIG. 4 illustrates selected details of embodiments of a descriptor list.

FIG. 4 is a block diagram of descriptor list 164 in accordance with one or more embodiments of the present invention. The descriptor list 164 comprises descriptors $410_1$-$410_N$ located in a contiguous memory region, typically in a single memory page such that DMA access is restricted to meet security requirements. In some such embodiments, each sequential descriptor $410_1$-$410_N$ is statically associated with a corresponding sequential slice (i.e., section) of a frame buffer (ref. exemplary slice 220 of FIG. 2) following frame buffer memory allocation. In an alternative embodiment, descriptor list 164 comprises a non-contiguous linked list of descriptors distributed over the same or different memory pages. Typically, in such an embodiments, each descriptor comprises an address pointer indicating the location in memory 120 (FIG. 1) of the next descriptor in the list 164. Transfer scheduler 162 in FIG. 1 adds descriptors to the descriptor list 164 in any order, so that sections associated with any frame buffer can be scheduled in any desired order for processing by DMAC 140 (FIG. 1).

Figure 5:
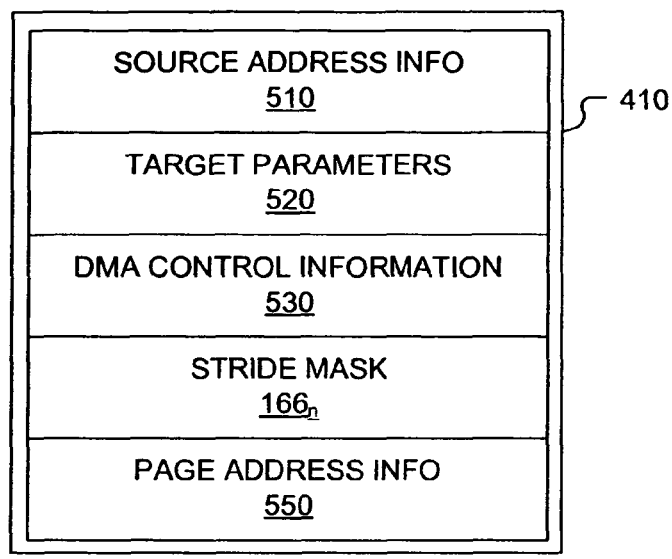
FIG. 5 is a block diagram of a descriptor in accordance with one or more embodiments of the present invention.

FIG. 5 is a block diagram of a descriptor 410 in accordance with one or more embodiments of the present invention. Descriptor 410 generally comprises addressing and control information utilized by DMAC 140 (ref. FIG. 1) for the transfer of image data located in 2D sub-sections of 2D sections designated by the stride mask of the corresponding descriptor. In an embodiment, such address and control information comprises source address information 510, target parameters 520, DMA control information 530, stride mask $166_n$, and page address information 550. In a linked list, the descriptor 410 further comprises an address field used to point to the next descriptor in the list 164.

In some embodiments, source address information 510 comprises the base address of the section, for example the address of pixel 308 in FIG. 3, and the length of rows in the section (ref. width 240 in FIG. 2); alternatively, the section row length is fixed and need not be explicitly provided. In other embodiments, the section base address is dynamic. In one such embodiment, each descriptor is associated with a window on a display, and as the window moves across the display, the slice base address is modified accordingly. In some direct-mapped embodiments, the source address information 510 comprises a single start address for the section, and the address translation from virtual to physical address is performed by the IOMMU unit in the processor and chipset 110. In embodiments where the start of the frame buffer is not page aligned, source address information 510 further comprises a page offset parameter (ref. offset 340 in FIG. 3). If the frame buffer does not match the image canvas dimensions, source address information 510 further comprises a buffer address pitch defining unused memory locations between consecutive rows (ref. address pitch 242 of frame buffer 175 in FIG. 2).

Target parameters 520 generally comprise information fields containing embedded parameters or instructions (or pointers to such parameters or instructions) intended for transfer to peripheral system 150 in FIG. 1. Such embedded parameters or instructions are transferred in conjunction with the frame buffer updates (i.e., the updated image data) and stored in allocated data structures of the target memory 152 of the peripheral system 150. Such data structures provide peripheral system 150 with subsequent processing actions, for example by specifying attributes of the image data (e.g., display device identification information in a multi-monitor configuration or image attributes) utilized during subsequent processing steps (e.g., a specified image encoding method). Target parameters 520 may also comprise temporally-specified frame and section identification parameters.

DMA control information 530 generally comprises one or more DMA control fields, including descriptor size information and various flags and/or preferences, such as 'enable' or 'disable' interrupts (e.g., "Interrupt on Completion", 'Interrupt at ½ complete', 'Last slice in frame' to aid pre-fetching of descriptors), DMA transfer timing requirements, a 'DMA Halt' command, or the like. The descriptor size is a variable parameter that enables the DMAC 140 to locate the next descriptor in memory 120, accounting for increased page count associated with partial buffers (i.e., embodiments in which page address information 550 includes a start address associated with a partial buffer). In some embodiments, DMA control information 530 comprises a "REPEAT" flag to indicate to DMAC 140 (FIG. 1) to ignore the stride mask of the current descriptor (i.e., stride mask $166_n$) and, instead, utilize the stride mask associated with the previous descriptor. Such a REPEAT flag saves the transfer scheduler from updating an entire stride mask for each descriptor in the presence of repeated update patterns across consecutive image sections.

DMA control information 530 may further comprise skip-forward directives that allow the DMAC 140 to read the first few memory spaces of the current descriptor ($410_n$) and then move directly to the next descriptor ($410_{n+1}$). Such skip-forward directives prevent wasted memory bandwidth related to reading the stride mask $166_n$ and page address information 550, often comprising the bulk of a descriptor's size. Inclusion of such directives increases execution efficiency of linear descriptors (ref. FIG. 4) compared to linked list descriptors, as the DMAC 140 traverses a linear list more efficiently than the transfer scheduler 162 can link descriptors given the currently available hypervisor and processor chipset/support circuit technologies. DMA control information 530 may further comprise an IGNORE field that nullifies the descriptor 410, used, for example, to direct the DMAC 140 to skip over the descriptors of a disconnected display device without a need to re-initialize the descriptor list 164.

In some embodiments, for example, in select embodiments where descriptors are arranged in a simple linear list depicted in FIG. 4, DMA control information 530 comprises a descriptor ownership bit used as a semaphore to track whether the descriptor is owned by the transfer scheduler 162 or the DMAC 140. The transfer scheduler 162 sets the ownership bit when the descriptor 410 is available for execution, and the DMAC 140 clears the ownership bit on completion. In some embodiments, head and tail pointers are used to determine descriptor ownership. An embodiment of a linked list structure utilizing head and tail pointers is described further below with respect to FIG. 6.

Stride mask $166_n$ indicates which sub-sections of the frame buffer section associated with the descriptor 410 should be fetched by DMAC 140 (FIG. 1) for transfer to target memory 152 (FIG. 1). In an embodiment, stride mask $166_n$ comprises an array of logic bits, one logic bit corresponding to each sub-section of the frame buffer (e.g., one bit in the array corresponding with each sub-section $222_1$-$222_N$ of FIG. 3). A logic '1' for a bit corresponding to a sub-section indicates that the image data within the sub-section should be transferred by the DMAC 140, while a logic '0' indicates the sub-section should be skipped. In various embodiments, DMAC 140 utilizes stride mask $166_n$ to gain processing efficiency. In some such embodiments, the mask information determines if DMA operations should be split or merged to ensure that efficient DMA accesses are performed. In other embodiments, DMAC 140 looks ahead into descriptor list 164 using the mask as an indicator to queue multiple DMA requests.

In various embodiments where frame buffer address translation is performed by configuration software in the hypervisor domain, the physical address for each consecutive page boundary associated with a section is listed in a corresponding field of page address information 550. If a frame buffer has an address pitch (ref. pitch 242 for buffer 175 in FIG. 2) larger than a memory page (e.g., >4 kilobytes), complete memory pages within unused memory (ref. region $230_1$ in FIG. 2) need not be explicitly identified in page address information 550. Rather, an alternative address pitch, specified in conjunction with removing page addresses associated with unused memory from page address information 550, serves to compact the length of the descriptor list 164. In some embodiments, such an alternative address pitch may be expressed as [1 kB+(original address pitch) modulo (1 kB)], A descriptor 410 with such an alternative expression of address pitch maintains compatibility with any sized image canvas.

Figure 6:
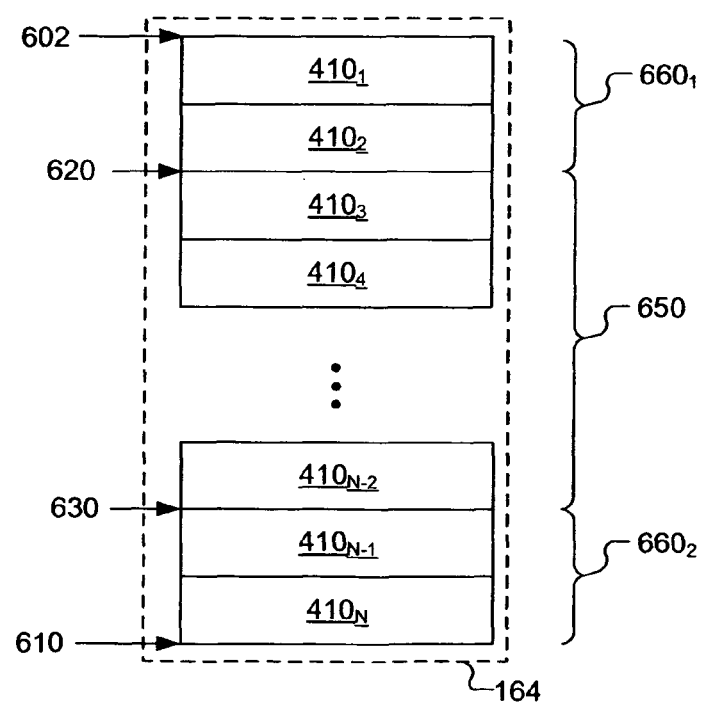
FIG. 6 is a block diagram illustrating one embodiment of a descriptor list showing managed ownership between a transfer scheduler and a DMA controller (DMAC)

FIG. 6 is a block diagram illustrating one embodiment of the descriptor list 164, showing managed ownership between transfer scheduler 162 and DMAC 140. Descriptor list 164 comprises descriptors $410_1$-$410_N$, commencing at base address 602 in memory 120 (FIG. 1) and ending at address 610. Head pointer 620 and tail pointer 630 are memory mapped registers, visible to both transfer scheduler 162 and DMAC 140, used to set descriptor ownership (i.e., which descriptors are owned by DMAC 140 and which are owned by the transfer scheduler 162 at any given time). In the exemplary time snapshot depicted in FIG. 6, partial descriptor list 650 is owned by DMAC 140, while partial descriptor lists $660_1$ and $660_2$ are owned by transfer scheduler 162.

On initialization, transfer scheduler 162 allocates memory for descriptor list 164 between addresses 602 and 610. Head pointer 620 and tail pointer 630 are initialized to base address 602, and DMAC 140 activated. No DMA transfers occur while the head and tail pointers are at the same address. When stride masks are updated (in response to an updated frame buffer), the one or more descriptors comprising the updated stride masks are written to the processing queue by the transfer scheduler 162 in FIG. 1; such descriptors contain address information (ref. source address information 510 and page address information 550 in FIG. 5) pointing to the updated frame buffer sections. The transfer scheduler 162 updates tail pointer 630 to the end of the added descriptors (ref. descriptor $410_{N-2}$ of FIG. 6) to indicate the descriptors that are available for DMA execution. DMAC 140 responds to the updated tail pointer 630 by reading descriptor $410_1$ and advancing head pointer 620 to the end of descriptor $410_1$ once descriptor $410_1$ has been processed, followed by performing analogous operations on descriptor $410_2$, as depicted in FIG. 6. Consequently, tail pointer 630 advances as descriptors become available for processing by DMAC 140, and head pointer 620 advances once the available descriptors have been processed.

Figure 7:
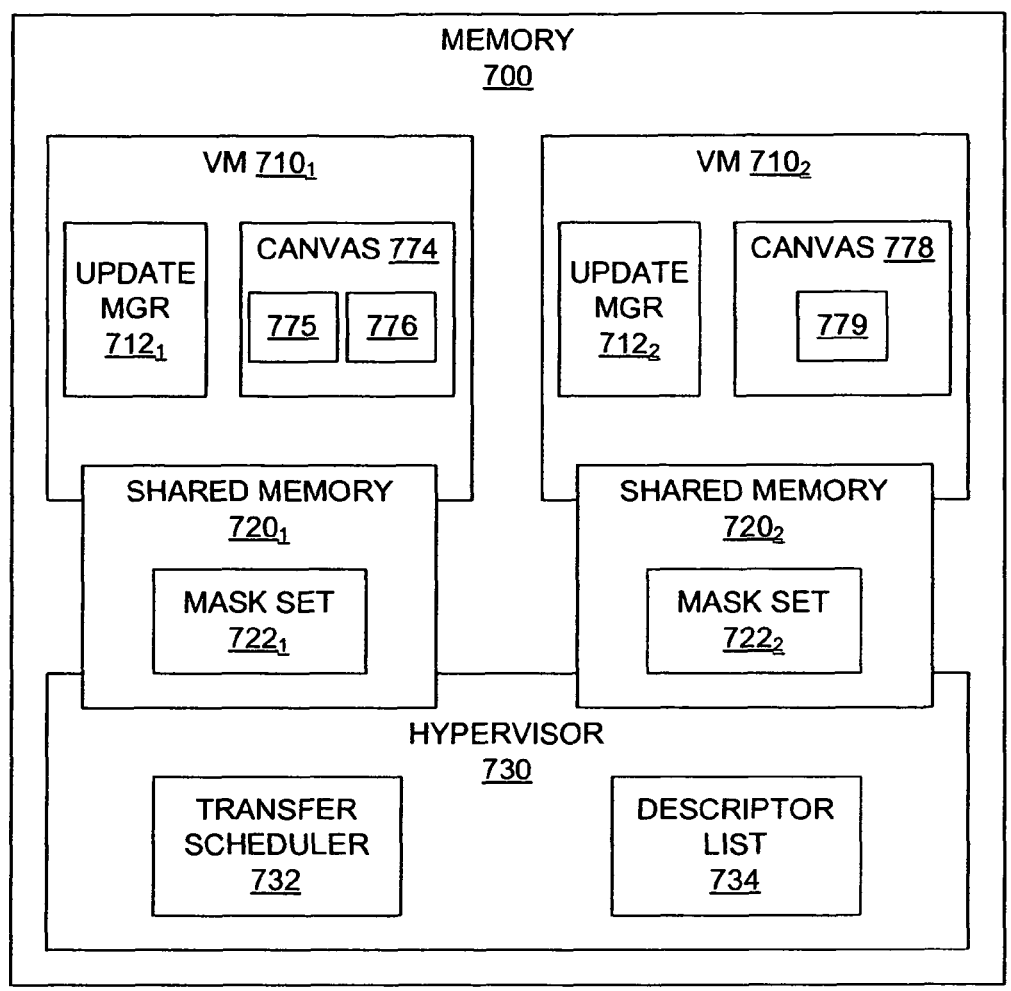
FIG. 7 is a block diagram of a memory comprising a virtualized software environment in accordance with one or more embodiments of the present invention.

FIG. 7 is a block diagram of a memory 700 comprising a virtualized software environment in accordance with one or more embodiments of the present invention. Memory 700 comprises a virtualized software environment in which both update manager and DMAC have access to stride masks in shared memory. Memory 700 depicts an alternative embodiment of memory 120 in FIG. 1. Memory 700 comprises VMs $710_1$ and $710_2$ under management of hypervisor 730. VM $710_1$ is an operating system domain as described for VM 170 in FIG. 1, comprising update manager $712_1$ and image canvas 774 with frame buffers 775 and 776. An embodiment of image canvas 774 is substantially similar to canvas 174 in FIG. 1. Shared memory $720_1$ stores mask set $722_1$, accessible to both VM $710_1$ and the DMAC (ref. DMAC 140 in FIG. 1). Mask set $722_1$, under management of update manager $712_1$, comprises stride masks (ref mask $166_1$-$166_N$ in FIG. 1) for both frame buffers 775 and 776. Each stride mask indicates locations of updated image sub-sections across a section of a frame buffer (i.e., sub-sections containing updated image data). Similarly, VM $710_2$ comprises update manager $712_2$ and canvas 778 with frame buffer 779. Shared memory $720_2$ stores a mask set $722_2$ associated with frame buffer 779, accessible to VM $710_2$ and the DMAC. Each stride mask of the mask set $722_2$ indicates locations of updated sub-sections across a section of frame buffer 779.

In some embodiments, update manager 712 communicates mask identification details and attributes to transfer scheduler 732 during mask configuration. Such mask identification details include a pointer to the base address of each mask in the set (for example as a Guest Physical Address (GPA)), frame buffer address information (for example in the form of one or more GPA addresses), frame buffer structure information (such as frame buffer section width, height and bytes per pixel), and other information, such as parameters similar to target parameters 520 depicted in FIG. 5. In other embodiments, hypervisor 730 allocates memory for mask set 722 and passes addressing information to update manager 712. Update manager $712_1$ detects updates made by operating system or application software to image canvas 774, and records detected sub-section updates in the corresponding mask of mask set $722_1$. Update manager $712_2$ executes in a comparable manner. In some embodiments, update manager 712 provides an indication to transfer scheduler 732 when one or masks from set 722 become available for processing so that image data within updated regions of the corresponding frame buffer can be transferred. Mask sets $722_1$ and $722_2$ may be maintained by their respective update managers at different privilege levels to the descriptors themselves comprising physical address information configured by transfer scheduler 732. Such an architecture enables transfer scheduler 732 to program DMA accessibility while update managers $712_1$ and $712_2$ are enabled to set mask bits without direct DMA programming privileges. This eliminates a need to copy mask data from shared memory 720 to the privilege level of descriptor list 734. In some embodiments, image canvas 774 and/or image canvas 778 are located in shared memory 720 accessible to hypervisor 130, or video memory associated with a GPU of processor and chipset 110 in FIG. 1.

FIG. 8 is an illustration of process 800 for transferring updated image data from sub-sections of frame buffers within a first memory to a second memory in accordance with one or more embodiments of the present invention. In some embodiments, the second memory is a target memory of a peripheral system, such as peripheral system 150. While an image data transfer operation typically comprises copying the image data from the first memory to the second memory, leaving the image data in the first memory unchanged, in some embodiments the image data may be modified between being read from the first memory location and being written to the second memory location.

Process 800 starts at step 802 and proceeds to step 804 ("Initialize System"). Step 804 generally comprises initialization of hardware and memory structures such as processor and chipset 110, memory 120, DMAC 140 and peripheral system 150, all shown in FIG. 1. Hypervisor 160, VMs 170, operating systems, update managers 172 and a transfer scheduler 162 are instantiated, and related data structures such as image canvases 174 and 178, frame buffers 175, 176, and 179, and peripheral system target memory 152 are allocated and/or initialized by the operating system and other software processes. In an embodiment, the operating system requests a 2D image canvas and frame buffer memory from the virtualization environment which are locked to prevent page swapping following initialization.

Process 800 proceeds to step 810 ("Initialize Descriptors and Masks"). The update manager, tasked with managing the bitmap mask and monitoring changes to the image data, initializes the bitmap mask. Typically all bits of the mask bitmap (ref bitmap 177) are set during initialization to indicate a need to transfer the entire frame buffer following initialization or display configuration change. In an embodiment, descriptor list 164 (FIG. 1) describing all the virtualized frame buffers of the system is initialized by configuration software in the hypervisor domain. Each descriptor is specified in terms of buffer address, buffer offset, number of rows, row length, address pitch and a list of physical page addresses that point to each of the physical memory pages associated with the particular frame buffer. In an embodiment, each descriptor (ref. FIG. 5) is associated with a section of 2D memory, each section further delineated into an array of 2D sub-sections (ref. sub-section 222 in FIG. 2). In select instances, such as a user-initiated change in display resolution or physically relocated frame buffer, the descriptor list is re-initialized with updated buffer descriptions and physical address information. The stride masks are set to indicate the image update status.

Process 800 proceeds to step 820 ("Update mask"). The stride mask associated with each descriptor is set based on the transfer requirement of the related sub-sections of the corresponding frame buffer, for example as detected by an update manager 172 in FIG. 1. Following system initialization, sub-sections deemed as updated since a previous transfer operation (ref. step 830) are flagged for transfer. In an embodiment, each update manager sets mask values in a bitmap data structure corresponding to the descriptor stride mask. The transfer scheduler in the hypervisor domain then scans the bitmap for update indicia, copies the relevant row of the bitmap mask into the corresponding descriptor stride mask and schedules the descriptor for processing by a DMAC. The descriptor may be scheduled for processing, for example, by writing it to an output queue (and setting a tail pointer as depicted in FIG. 6), adding it to a linked list or setting a descriptor flag to be polled by the DMAC, thereby enabling out of order descriptor processing. In some embodiments, descriptors are aggregated according to physical frame buffer accessibility attributes or ordered according to processing resource availability or ordered in a manner suited to the peripheral system (e.g., real-time attributes of the image data).

Process 800 proceeds to step 830 ("Transfer Image Data") in which scheduled descriptors are processed by a DMAC. Based on the mask and the address pitch, the DMAC determines a physical page address offset and selects one or more page addresses from the list of physical page addresses in the page address information field (ref. Page Address Information 550 in FIG. 5) for each scheduled descriptor. In some embodiments, the DMAC aggregates physical page addresses to enable burst transfer methods supported by the underlying processor expansion bus. The DMAC processes the scheduled list by accessing the 2D sub-section(s) referenced by descriptor stride masks and transferring the 2D sub-sections to corresponding target memory of the peripheral system. In some embodiments, additional target parameters, such as image attributes or display device ID information stored in the descriptor, are also communicated to the peripheral system. To prevent display tearing effects, image rendering in the VM associated with scheduled descriptors may be paused until processing of the current scheduled list and frame buffer transfer operations are complete. In an embodiment where the DMAC comprises multiple DMA engines, a portion of the descriptor list assigned to a selection of virtualized frame buffers is scheduled for processing, typically with rendering suspended, while the update managers associated with other virtualized frame buffers concurrently execute in conjunction with the transfer scheduler to update other non-scheduled portions of the descriptor list. If image data becomes stale or obsolete, for example as deemed by the peripheral system, the DMAC may purge the committed descriptors rather than transfer the obsolete image data. Step 830 may further comprise error handling methods that ensure image data transfer continues from valid frame buffers in the presence of other purged or corrupted frame buffers, which may, for example, become invalid during DMAC transfer operations. One approach comprises ignoring errors received from the hypervisor 160 or bus 114 in FIG. 1 (e.g., received Transaction Layer Protocol (TLP) errors) until an operational frame buffer is encountered.

Process 800 proceeds to step 840 ("Indicate Transfer Status"). Once a sub-section transfer is completed, the DMAC provides an indication of the transfer completion status to the transfer scheduler. The DMAC may provide such an indication, for example, by performing at least one of advancing a tail pointer, clearing a software flag related to descriptor ownership, initiating an interrupt signal if a scheduled list has been processed or clearing an individual stride mask bit in conjunction with the processing of a sub-section. In some embodiments, a transfer completion signal is delayed based on processing status information (e.g., image processing status) provided by the peripheral system. The transfer scheduler provides the update manager with an indication of transfer status so that the mask bitmap (ref mask bitmap 177 in FIG. 1) can be cleared in conjunction with resumed rendering to related sections.

Process 800 proceeds to step 850 ("Complete?"), where it is determined if process 800 should continue transferring frame buffer updates. If additional transfer is required, process 800 returns to step 820. If the display resolution or system configuration has changed (e.g., display connection change) such that redefinition of descriptors is required, process 800 returns to step 810. If transfer is concluded, for example at the end of a computing session, process 800 ends at step 860.

While the foregoing is directed to embodiments of the present invention, other and further embodiments of the invention may be devised without departing from the basic scope thereof, and the scope thereof is determined by the claims that follow.

The invention claimed is:

1. A method for transferring data from a first computer memory of a computer system to a second computer memory of the computer system, at least a portion of the method being performed by the computer system comprising at least one processor, the method comprising:
   (i) initializing a descriptor with a description of physical addressing of a first two dimensional (2D) section of a first 2D data array of the first computer memory;
   (ii) updating a mask associated with the descriptor with an indication for transferring image data from a first 2D sub-section of the first 2D section to the second computer memory, the mask and the image data managed by an application on a first virtual machine of the computer system, the application isolated from the physical addressing of the first 2D section;
   (iii) responsive to the updated mask, (a) determining physical addresses of the first 2D sub-section based on the description of physical addressing, and (b) transferring the image data from the first 2D sub-section to the second computer memory; and
   (iv) clearing at least a portion of the updated mask to indicate completion of transferring the image data to the second computer memory.

2. The method of claim 1, wherein transferring the image data comprises at least one of:
   leaving the image data of the first computer memory unchanged;
   storing a modified instance of the image data in the second computer memory, the modified instance of the image data comprising at least one of a data structure change or encoded data; or
   transferring the image data via a processor expansion bus.

3. The method of claim 1, wherein the description of physical addressing comprises a dimension of the first 2D section, a base physical address of the first 2D section, an address pitch of the first 2D section, and a list of physical page addresses of the first 2D section.

4. The method of claim 3, wherein determining the physical addresses comprises:
   selecting page addresses from the list of physical page addresses;
   determining physical page address offsets based on the mask and the address pitch; and
   aggregating addresses of the transferring the image data to support burst transfers over a processor expansion bus.

5. The method of claim 1, further comprising (vi) initializing each descriptor of a plurality of descriptors with a different description of physical addressing of a different 2D section from a plurality of 2D sections of a plurality of 2D data arrays, wherein each 2D data array of the plurality of 2D data arrays is associated with a different virtual machine operating in the computer system.

6. The method of claim 5, further comprising, subsequent to step (vi), repeating steps (ii), (iii) and (iv) for descriptors of the plurality of descriptors that are associated with selective 2D sub-sections of the plurality of 2D sections.

7. The method of claim 6, wherein repeating steps (ii), (iii), and (iv) comprises determining an availability of processing resources associated with each 2D data array in the plurality of 2D data arrays.

8. The method of claim 7, wherein the processing resources comprise image encoding and communicating resources, the processing resources managed by a peripheral system comprising the second computer memory.

9. The method of claim 6, further comprising, subsequent to step (ii), processing the plurality of descriptors to determine the updated mask, wherein the plurality of descriptors are organized as a list of descriptors.

10. The method of claim 1, wherein the mask is accessible to the first virtual machine and wherein the descriptor is protected from access by the first virtual machine.

11. The method of claim 1, wherein the first 2D data array comprises an unaligned subset of a larger 2D data array, and the first 2D sub-section is rectangular with dimensions of at least 8×8 pixels.

12. The method of claim 1, wherein the descriptor comprises the mask, and wherein the image data is transferred in an order suitable for processing by a peripheral system comprising the second computer memory.

13. A system for transferring data from a selection of two dimensional (2D) sub-sections of a plurality of 2D data arrays, the system comprising:
   a computer memory enabled to store (i) the plurality of 2D data arrays, wherein the plurality of 2D data arrays comprises a plurality of physical memory pages with autonomous physical addressing, (ii) a plurality of descriptors comprising address information of the autonomous physical addressing and dimensional information of the plurality of 2D data arrays, and (iii) a plurality of masks comprising change indicia for identifying the selection of 2D sub-sections;
   a Direct Memory Access (DMA) controller, coupled to the computer memory, enabled to (iv) determine the selection of 2D sub-sections based on an indication of readiness to process the selection of 2D sub-sections and the change indicia in the plurality of masks, (v) read the plurality of descriptors to obtain the address information and the dimensional information, and (vi) generate transfer operations based on the address information and the dimensional information; and
   a peripheral system, coupled to the computer memory, enabled to (vii) receive image data from the selection of 2D sub-sections resulting from the transfer operations, and (viii) generate the indication of readiness.

14. The system of claim 13, wherein the DMA controller generates the transfer operations by calculating physical addresses of the selection of 2D sub-sections based on the address information and the dimensional information.

15. The system of claim 14, wherein the address information comprises page addresses and offset values, and the dimensional information comprises a pitch value.

16. The system of claim 13, wherein the autonomous physical addressing is isolated from a logical addressing of the plurality of 2D data arrays, the logical addressing used in generating data for the plurality of 2D data arrays; the peripheral system comprises the DMA controller; and generating the transfer operations comprises determining sections of the plurality of physical memory pages associated with the selection of 2D sub-sections.

* * * * *